United States Patent
Ishikawa et al.

(10) Patent No.: US 11,368,019 B2
(45) Date of Patent: Jun. 21, 2022

(54) ACTIVE FILTER DEVICE AND AIR CONDITIONER

(71) Applicant: Mitsubishi Electric Corporation, Tokyo (JP)

(72) Inventors: Shuta Ishikawa, Tokyo (JP); Shusaku Nakase, Tokyo (JP); Keiichi Yamamoto, Tokyo (JP); Keisuke Ishikura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/425,069

(22) PCT Filed: Apr. 2, 2019

(86) PCT No.: PCT/JP2019/014640
§ 371 (c)(1),
(2) Date: Jul. 22, 2021

(87) PCT Pub. No.: WO2020/202467
PCT Pub. Date: Oct. 8, 2020

(65) Prior Publication Data
US 2022/0102975 A1     Mar. 31, 2022

(51) Int. Cl.
*H02M 1/42*     (2007.01)
*H02M 7/217*    (2006.01)
(Continued)

(52) U.S. Cl.
CPC ................... *H02J 3/01* (2013.01); *H02J 3/16* (2013.01); *H02J 3/18* (2013.01); *G05B 11/42* (2013.01); *H02M 1/12* (2013.01)

(58) Field of Classification Search
CPC ............................. H02J 13/0006; H02J 3/01
See application file for complete search history.

(56) References Cited

U.S. PATENT DOCUMENTS 10,797,589 B2 *  10/2020  Bhardwaj ............... H02M 1/44
2016/0070241 A1   3/2016  Kawashima
(Continued)

FOREIGN PATENT DOCUMENTS

JP    2001-186752 A    7/2001
JP    2012-143095 A    7/2012
(Continued)

OTHER PUBLICATIONS

International Search Report dated Jun. 11, 2019, issued in corresponding International Application No. PCT/JP2019/014640 (and English Machine Translation).

*Primary Examiner* — Jared Fureman
*Assistant Examiner* — Esayas G Yeshaw
(74) *Attorney, Agent, or Firm* — Posz Law Group, PLC

(57) ABSTRACT

An active filter device includes a power module configured to generate a compensating current to suppress a harmonic current generated from a load device and a controller configured to control the power module. The controller includes a current command calculation unit configured to calculate a compensating current command to suppress the harmonic current, a control variable calculation unit configured to calculate a control variable based on a deviation between the compensating current command and an actual compensating current, a duty cycle calculation unit configured to calculate duty cycle of each of three phases based on the control variable, a duty cycle modulation unit configured to perform two-phase modulation on the duty cycle of each of three phases, and a control signal generation unit configured to, after the two-phase modulation, generate, from the duty cycle of each of three phases, a control signal to drive the power module.

10 Claims, 8 Drawing Sheets

(51) Int. Cl.
  *H02J 3/01*   (2006.01)
  *H02J 3/16*   (2006.01)
  *H02J 3/18*   (2006.01)
  *H02M 1/12*   (2006.01)
  *G05B 11/42*  (2006.01)

(56) References Cited

U.S. PATENT DOCUMENTS

2016/0315565 A1* 10/2016 Vuletic ............... H02P 21/22
2017/0315188 A1* 11/2017 Lin ................... G01R 33/3852
2020/0067399 A1   2/2020 Iwazaki et al.
2022/0006445 A1*  1/2022 Takeda ................ H02J 3/01

FOREIGN PATENT DOCUMENTS

| JP | 2014-147234 A | 8/2014 |
| JP | 2014-207798 A | 10/2014 |
| JP | 2014-217206 A | 11/2014 |
| JP | 2015-027231 A | 2/2015 |
| JP | 2015-111995 A | 6/2015 |
| WO | 2018/142543 A1 | 8/2018 |

* cited by examiner

FIG. 7

| MODE m | PHASE TO BE LOCKED | ALWAYS ON | ALWAYS OFF | ADDRESS N | CORRESPONDING POWER SUPPLY PHASE ANGLE (WITH REFERENCE TO RS ZERO-CROSSING) |
|---|---|---|---|---|---|
| 1 | R PHASE | P SIDE | N SIDE | 63~104 | 90~150deg |
| 2 | R PHASE | N SIDE | P SIDE | 188~229 | 270~330deg |
| 3 | S PHASE | P SIDE | N SIDE | 146~187 | 210~270deg |
| 4 | S PHASE | N SIDE | P SIDE | 21~62 | 30~90deg |
| 5 | T PHASE | P SIDE | N SIDE | 0~20, 230~250 | 0~30, 330~360deg |
| 6 | T PHASE | N SIDE | P SIDE | 105~145 | 150~210deg |

FIG. 8

| MODE m | PHASE TO BE LOCKED | ALWAYS ON | ALWAYS OFF | OUTPUT FROM DUTY CYCLE MODIFICATION UNIT | | |
|---|---|---|---|---|---|---|
| | | | | $D_r^*$ | $D_s^*$ | $D_t^*$ |
| 1 | R PHASE | P SIDE | N SIDE | $+1$ | $D_s^* + (1 - D_r^*)$ | $D_t^* + (1 - D_r^*)$ |
| 2 | R PHASE | N SIDE | P SIDE | $-1$ | $D_s^* + (-1 - D_r^*)$ | $D_t^* + (-1 - D_r^*)$ |
| 3 | S PHASE | P SIDE | N SIDE | $D_r^* + (1 - D_s^*)$ | $+1$ | $D_t^* + (1 - D_s^*)$ |
| 4 | S PHASE | N SIDE | P SIDE | $D_r^* + (-1 - D_s^*)$ | $-1$ | $D_t^* + (-1 - D_s^*)$ |
| 5 | T PHASE | P SIDE | N SIDE | $D_r^* + (1 - D_t^*)$ | $D_s^* + (1 - D_t^*)$ | $+1$ |
| 6 | T PHASE | N SIDE | P SIDE | $D_r^* + (-1 - D_t^*)$ | $D_s^* + (-1 - D_t^*)$ | $-1$ |

FIG. 11    Comparative Example

| MODE m | PHASE TO BE LOCKED | ALWAYS ON | ALWAYS OFF | ADDRESS N |
|---|---|---|---|---|
| 1 | R PHASE | P SIDE | N SIDE | 53~114 |
| 2 | R PHASE | N SIDE | P SIDE | 178~239 |
| 3 | S PHASE | P SIDE | N SIDE | 141~177 |
| 4 | S PHASE | N SIDE | P SIDE | 21~52 |
| 5 | T PHASE | P SIDE | N SIDE | 0~20, 240~250 |
| 6 | T PHASE | N SIDE | P SIDE | 115~140 |

ACTIVE FILTER DEVICE AND AIR CONDITIONER

CROSS REFERENCE TO RELATED APPLICATION

This application is a U.S. National Stage Application of International Application No. PCT/JP2019/014640, filed on Apr. 2, 2019, the contents of which are incorporated herein by reference.

TECHNICAL FIELD

The present disclosure relates to an active filter device configured to suppress a harmonic current generated from a harmonic generation load and an air conditioner including such an active filter device.

BACKGROUND

It has been known that a harmonic current generated from a harmonic generation load connected to a power source is suppressed by connecting an active filter device in parallel to the harmonic generation load. Further, for improvement in harmonic suppression capacity of the active filter device, Patent Literature 1 proposes employing repetitive control in addition to normal feedback control such as proportional, integral, and derivative control. With attention focused on the fact that a harmonic current has a period characteristic corresponding to a power supply frequency, repetitive control involves integrating a deviation between a compensating current command and an actual compensating current for each phase angle of the power source and controlling the active filter device based on a result of the integration. Repetitive control makes it possible to mitigate the effect of a delay caused by dead time generated by digital control and improve the harmonic suppression capacity.

PATENT LITERATURE

Patent Literature 1: Japanese Unexamined Patent Application Publication No. 2001-186752

In the conventional active filter device, switching from a voltage non-saturation state to a voltage saturation state or from a voltage saturation state to a voltage non-saturation state triggers switching between the presence and absence of dead time, causing a large change in output voltage of the active filter device. Repetitive control is slow in control response, as it gives feedback only once for each phase angle of a power supply period. This makes it impossible to respond to a change in output voltage at the time of switching of voltage saturation states, undesirably causing a considerable distortion of a compensating current. Possible measures to suppress a distortion of a compensating current include controlling the DC voltage of the active filter device high and actuating the active filter device so that no saturation occurs, providing a limiter so that no voltage saturation occurs even at the time of an abnormality in power supply voltage or harmonic generation load, or other measures.

The active filter device suffers an increased switching loss, as all switching elements in a power module are subjected to switching with a carrier period. For that reason, a loss reduction of the power module is desired. However, controlling the DC voltage high or providing a limiter as noted above to suppress a distortion of a compensating current invites an increase in loss of the power module, posing an impediment to a loss reduction in the active filter device.

SUMMARY

The present disclosure is intended to solve such a problem, and has as an object to provide an active filter device configured to achieve a loss reduction while maintaining harmonic current suppression performance and an air conditioner including such an active filter device.

An active filter device according to an embodiment of the present disclosure includes a power module configured to generate a compensating current to suppress a harmonic current generated from a load device and a controller configured to control the power module. The controller includes a current command calculation unit configured to calculate a compensating current command to suppress the harmonic current, a control variable calculation unit configured to calculate a control variable based on a deviation between the compensating current command and an actual compensating current, a duty cycle calculation unit configured to calculate duty cycle of each of three phases based on the control variable, a duty cycle modulation unit configured to perform two-phase modulation on the duty cycle of each of three phases, and a control signal generation unit configured to, after the two-phase modulation, generate, from the duty cycle of each of three phases, a control signal to drive the power module.

The embodiment of the present disclosure makes it possible to, by performing two-phase modulation on the duty cycle with the duty cycle modulation unit, achieve a reduction in the number of times switching is done and a reduction in DC voltage and makes it possible to achieve a loss reduction of the active filter device while maintaining harmonic current suppression performance.

BRIEF DESCRIPTION OF DRAWINGS

FIG. 7 is a table showing an example of a method for determining a mode with a mode determination unit of Embodiment 1.

FIG. 8 is a table showing an example of a method for modifying duty cycles with a duty cycle modification unit of Embodiment 1.

FIG. 11 illustrates examples of operating waveforms in an active filter device of a comparative example.

DETAILED DESCRIPTION

Embodiment 1

Figure 1:
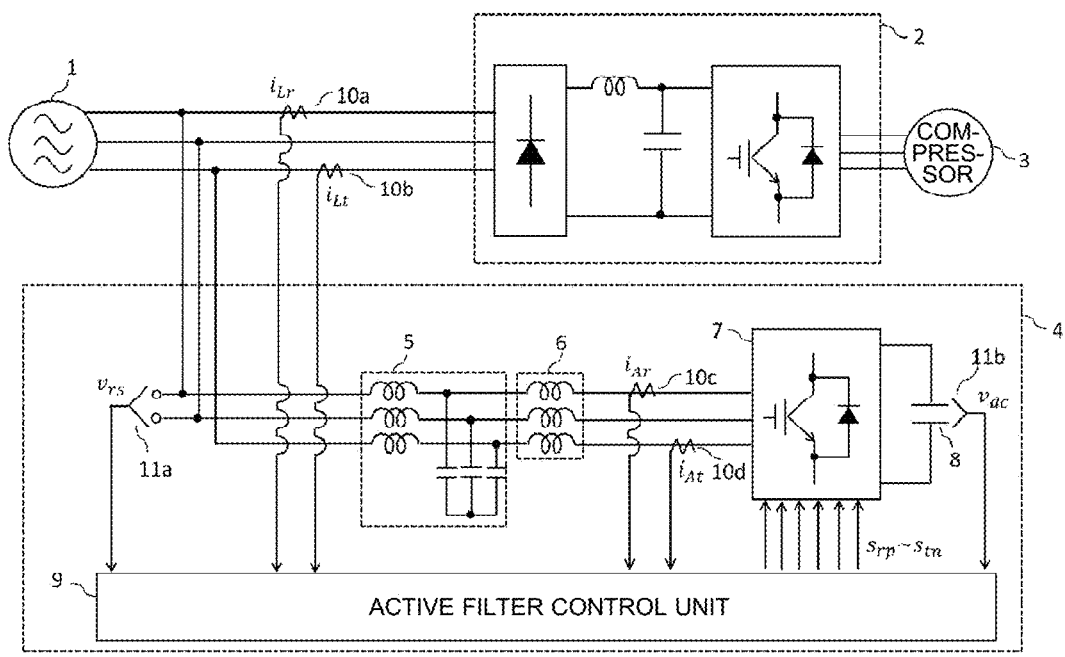
FIG. 1 is a schematic view of the configuration of an air conditioner including an active filter device according to Embodiment 1.

FIG. 1 is a schematic view of the configuration of an air conditioner 100 including an active filter device 4 according to Embodiment 1. The active filter device 4 of Embodiment 1 is configured to suppress a harmonic current generated in an inverter device 2 of the air conditioner 100. The air conditioner 100 includes a three-phase power source 1, a compressor 3, the inverter device 2, which drives the compressor 3, and the active filter device 4. As shown in FIG. 1, the active filter device 4 is connected to the three-phase power source 1 in parallel with the inverter device 2, which is a load device.

The active filter device 4 includes a filter circuit 5 including a reactor and a capacitor, a control reactor 6, a power module 7, a capacitor 8, and an active filter control unit 9.

The power module 7 is a power module for use in a three-phase inverter that includes six elements. Each element of the power module 7 is constituted by a reflux diode connected in antiparallel to a switching element. In the present embodiment, the switching element is an IGBT. Alternatively, the switching element may be a MOSFET. Further, while it is usual to use Si (silicon) as a semiconductor, it is also possible to use SiC (silicon carbide) or GaN (gallium nitride).

Further, the active filter device 4 includes four current sensors 10a, 10b, 10c, and 10d and two voltage sensors 11a and 11b. The current sensor 10a detects an R-phase load current $i_{Lr}$ of the inverter device 2, and the current sensor 10b detects a T-phase load current $i_{Lt}$ of the inverter device 2. The current sensor 10c detects an R-phase compensating current $i_{Ar}$ flowing through the control reactor 6, and the current sensor 10d detects a T-phase compensating current $i_{At}$ flowing through the control reactor 6. Instead of being configured such that the R-phase and T-phase currents are detected by the current sensors 10a, 10b, 10c, and 10d, the present embodiment may be configured such that R-phase and S-phase or S-phase and T-phase currents are detected by the current sensors 10a, 10b, 10c, and 10d. The voltage sensor 11a detects an R-S power supply voltage $V_{rs}$ inputted to the active filter device 4, and the voltage sensor 11b detects a DC voltage $V_{dc}$ of the capacitor 8. Instead of being configured to detect the R-S voltage, the voltage sensor 11a may be configured to detect an R-T or S-T voltage.

Detection results yielded by the current sensors 10a, 10b, 10c, and 10d and the voltage sensors 11a and 11b are inputted to the active filter control unit 9. The active filter control unit 9 outputs six control signals $S_{rp}$, $S_{rn}$, $S_{sp}$, $S_{sn}$, $S_{tp}$, and $S_{tn}$ to the power module 7. The power module 7 operates as appropriate in accordance with these control signals, whereby the harmonic current generated in the inverter device 2 of the air conditioner 100 can be suppressed.

Figure 2:
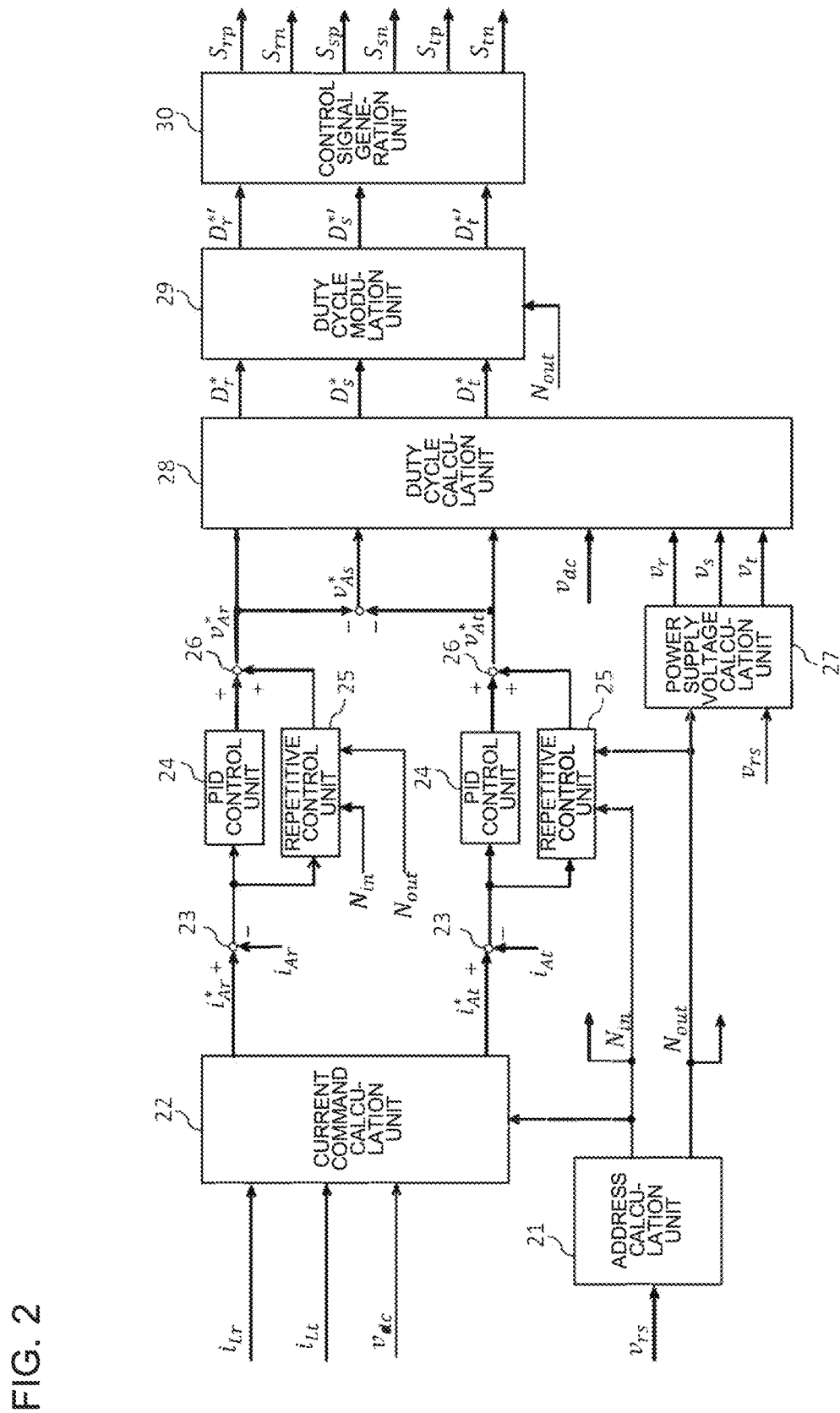
FIG. 2 is a block diagram of an active filter control unit according to Embodiment 1.

The following describes the active filter control unit 9. FIG. 2 is a block diagram of the active filter control unit 9 according to Embodiment 1. The active filter control unit 9 includes an address calculation unit 21, a current command calculation unit 22, a plurality of PID control units 24, a plurality of repetitive control units 25, a power supply voltage calculation unit 27, a duty cycle calculation unit 28, a duty cycle modulation unit 29, and a control signal generation unit 30. The active filter control unit 9 further includes a plurality of subtracters 23 and a plurality of adders 26.

The active filter control unit 9 includes a microcomputer or a processor and a memory having stored therein software for causing components to fulfill their functions. Alternatively, the active filter control unit 9 may be constituted by dedicated hardware using an ASIC (application specific integrated circuit) or an FPGA (Field Programmable Gate Array), and the components may be implemented as separate pieces of hardware or one piece of hardware.

Figure 3:
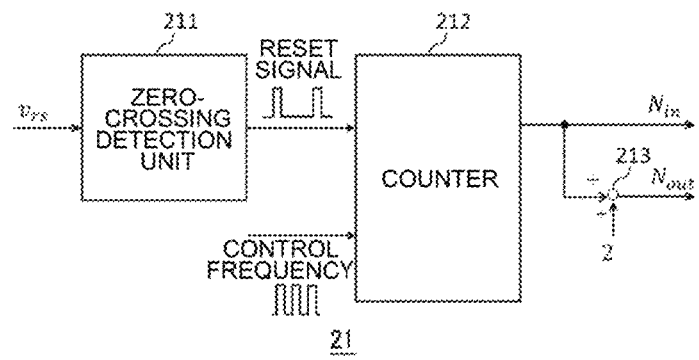
FIG. 3 is a block diagram of an address calculation unit according to Embodiment 1.

FIG. 3 is a block diagram of the address calculation unit 21 according to Embodiment 1. The address calculation unit 21 calculates an address corresponding to a phase angle of the power supply voltage $V_{rs}$ inputted to the active filter device 4. Specifically, the address calculation unit 21 includes a zero-crossing detection unit 211, a counter 212, and an adder 213. The zero-crossing detection unit 211 detects a moment (i.e. a zero-crossing) at which the power supply voltage $V_{rs}$ switches from negative to positive, and outputs a reset signal to the counter 212. The counter 212 counts up by 1 every control period and, upon receiving a reset signal from the zero-crossing detection unit 211, resets the count to 0. The counter 212 outputs the count as an input address $N_{in}$.

The number of addresses is described. For example, in a case in which the power module 7 has a control frequency of 15 kHz and a power supply frequency of 60 Hz, 15000/60=250 holds, so that N=250 addresses are outputted per period of the power supply voltage $V_{rs}$. An address corresponds to a phase angle of the power supply voltage $V_{rs}$, and in the case of the aforementioned example, there is a phase angle of 1.444 deg (360 deg/250) per address. In a case in which the power supply frequency is an aliquant part of the control frequency or in a case in which there is a lag in the timing of a zero-crossing, the number N of addresses increases or decreases.

The adder 213 adds 2 to the input address $N_{in}$ outputted from the counter 212 and outputs the sum as an output address $N_{out}$. The following gives a reason why the output address $N_{out}$ is differentiated from the input address $N_{in}$. In a case in which a microcomputer is used in the active filter control unit 9, a control delay occurs due to dead time of an operation. Therefore, making the input address $N_{in}$ and the output address $N_{out}$ the same causes a lag in the timing of control. Given these circumstances, the lag in the timing is suppressed by making the output address $N_{out}$ 2 ahead of the input address $N_{in}$. In the present embodiment, an address corresponding to a phase angle is calculated by the zero-crossing detection unit 211 and the counter 212. Alternatively, an address may be obtained by using a PLL (phase-locked loop).

Figure 4:
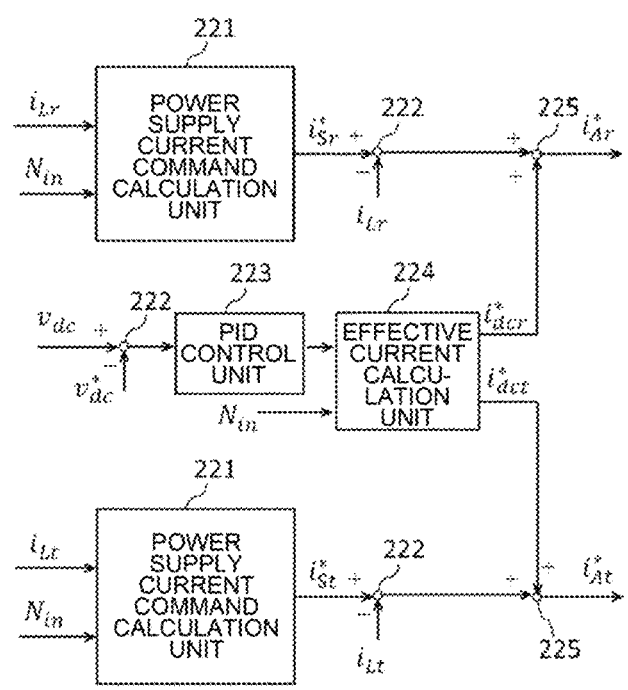
FIG. 4 is a block diagram of a current command calculation unit according to Embodiment 1.

The following describes the current command calculation unit 22. FIG. 4 is a block diagram of the current command calculation unit 22 according to Embodiment 1. The current command calculation unit 22 calculates compensating current commands $i^*_{Ar}$ and $i^*_{At}$ to suppress the harmonic current for each address and turn a power supply current into a sinusoidal wave. The current command calculation unit 22 includes a plurality of power supply current command calculation units 221, a plurality of subtracters 222, a PID control unit 223, an effective current calculation unit 224, and a plurality of adders 225. A total of two power supply current command calculation units 221 are provided separately for an R phase and a T phase. The following description takes an R-phase component as an example.

The power supply current command calculation unit 221 calculates an ideal sinusoidal current command i*$_{Sr}$. Specifically, the power supply current command calculation unit 221 calculates the sinusoidal current command i*$_{Sr}$ by extracting a fundamental component by a Fourier series expansion of the load current i$_{Lr}$. Moreover, a compensating current command to suppress the harmonic current is calculated by subtracting the load current i$_{Lr}$ from the sinusoidal current command i*$_{Sr}$ with a subtracter 222.

However, simply subtracting the load current i$_{Lr}$ from the sinusoidal current command i*$_{Sr}$ makes the gain of electrical power indistinct. In that case, the DC voltage V$_{dc}$ cannot be controlled, with the result that a lack of voltage may make the active filter device 4 uncontrollable or an excess of voltage may make it inevitable to make an abnormal stop. For that reason, the current command calculation unit 22 of the present embodiment includes a system for controlling the DC voltage V$_{dc}$. Specifically, a deviation between the DC voltage V$_{dc}$ and a command value v*dc thereof is taken by a subtracter 22, and a control variable of a bus current is calculated by the PID control unit 223. Furthermore, a current command i*$_{dcr}$ in phase with the power supply voltage is calculated based on the input address N$_{in}$ by the effective current calculation unit 224. Moreover, the current command i*$_{dcr}$ is added by an adder 225 to the current command outputted from the subtracter 222, whereby the final compensating current command i*$_{Ar}$ is calculated. The compensating current command i*$_{At}$ in a T-phase component is calculated in a manner similar to that in which the compensating current command i*$_{Ar}$ is calculated.

The PID control unit 223 performs common feedback control consisting of proportional (P), integral (I), and derivative (D) control. The PID control unit 223 may perform P control, PI control, PD control, or control based on any selective combination thereof instead of PID control.

With continued reference to FIG. 2, the subtracter 23 takes a deviation between the compensating current command i*$_{Ar}$ calculated by the current command calculation unit 22 and the actual compensating current i$_{Ar}$. The PID control unit 24 performs feedback control by PID control based on the deviation between the compensating current command i*$_{Ar}$ and the actual compensating current i$_{Ar}$ and outputs a control variable. As is the case with the PID control unit 223, the PID control unit 24 may perform P control, PI control, PD control, or control based on any selective combination thereof instead of PID control.

Figure 5:
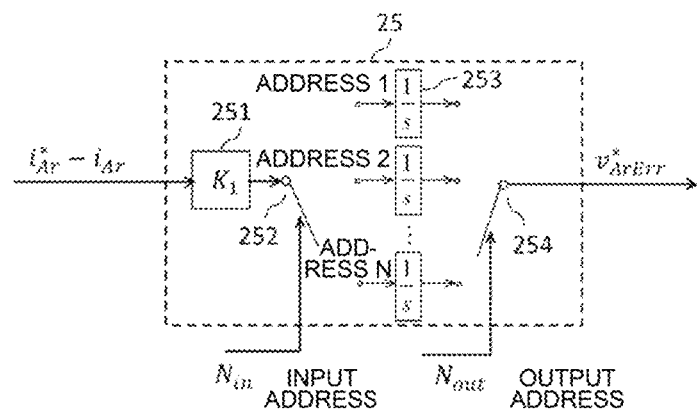
FIG. 5 is a block diagram of a repetitive control unit according to Embodiment 1.

Further, the present embodiment includes a repetitive control unit 25 in addition to the PID control unit 24. FIG. 5 is a block diagram of the repetitive control unit 25 according to Embodiment 1. The repetitive control unit 25 includes a gain 251, an input address determination unit 252, a plurality of integrators 253, and an output address determination unit 254.

The input address determination unit 252 switches its output to any of the plurality of integrators 253 according to the input address N$_{in}$, and the output address determination unit 254 switches its input to any of the plurality of integrators 253 according to the output address N$_{out}$. The plurality of integrator 253 integrate the deviation between the compensating current command i*$_{Ar}$ and the actual compensating current i$_{Ar}$ for each address. For example, in the case of a control frequency of 15 kHz and a power supply frequency of 60 Hz, the repetitive control unit 25 includes 250 integrators 253 corresponding to addresses. Moreover, a control variable v*$_{ArErr}$ for each address is outputted based on values of integral of the plurality of integrators 253. Since repetitive control per se is publicly known, a detailed description of the operation is omitted. Including the repetitive control unit 25 makes it possible to reproduce the compensating current command i*$_{Ar}$ more faithfully and improve the harmonic suppression capacity.

In the present embodiment, the gain 251 is disposed in front of the input address determination unit 252, but the results of calculations stay constant regardless of whether the gain 251 is disposed immediately behind the output address determination unit 254 or in front of or immediately behind all of the integrators 253. The gain 251 can be moved to any position, provided the results of calculations stay constant. The PID control unit 24 or the repetitive control unit 25 of the present embodiment corresponds to the "control variable calculation unit".

With continued reference to FIG. 2, the adder 26 adds up the control variable outputted from the PID control unit 24 and the control variable outputted from the repetitive control unit 25 and outputs the sum to the duty cycle calculation unit 28. The power supply voltage calculation unit 27 calculates power supply phase voltages v$_r$, v$_s$, and v$_t$ from the power supply voltage V$_{rs}$ and the output address N$_{out}$ and outputs the power supply phase voltages v$_r$, v$_s$, and v$_t$ to the duty cycle calculation unit 28.

The duty cycle calculation unit 28 calculates duty cycles D*$_r$, D*$_s$, and D*$_t$ of the respective phases according to Formulas (1) to (3) below. The duty cycles D*$_r$, D*$_s$, and D*$_t$ thus calculated are outputted to the duty cycle modulation unit 29.

$$D^*_r = (v_r - v^*_{ar})/(v_{dc} \times 0.5) \quad (1)$$

$$D^*_s = (v_s - v^*_{as})/(v_{dc} \times 0.5) \quad (2)$$

$$D^*_t = (v_t - v^*_{at})/(v_{dc} \times 0.5) \quad (3)$$

Note here that v*$_{ar}$ is the sum of the control variable outputted from the PID control unit 24 in the R phase and the control variable outputted from the repetitive control unit 25 in the R phase. v*$_{at}$ is the sum of the control variable outputted from the PID control unit 24 in the T phase and the control variable outputted from the repetitive control unit 25 in the T phase. Further, v*$_{as}$ is obtained by subtracting v*$_{ar}$ and v*$_{at}$, as the sum of v*$_{ar}$, v*$_{as}$, and v*$_{at}$ is 0.

Figure 6:
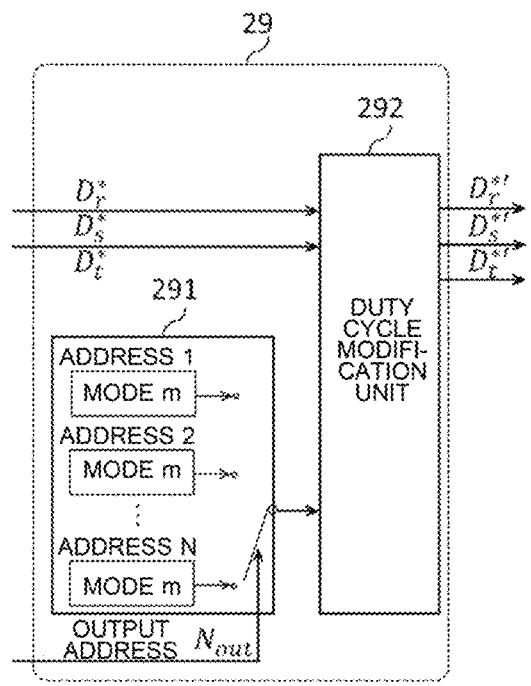
FIG. 6 is a block diagram of a duty cycle modulation unit according to Embodiment 1.

The duty cycle modulation unit 29 performs two-phase modulation on the duty cycle of each of three phases D*$_r$, D*$_s$, and D*$_t$ outputted from the duty cycle calculation unit 28. FIG. 6 is a block diagram of the duty cycle modulation unit 29 according to Embodiment 1. The duty cycle modulation unit 29 includes a mode determination unit 291 and a duty cycle modification unit 292.

The mode determination unit 291 determines a mode of two-phase modulation for each address. FIG. 7 is a table showing an example of a method for determining a mode with the mode determination unit 291 of Embodiment 1. There are three phases to be locked during two-phase modulation, namely the R phase, the S phase, and the T phase. Further, there are two operating states of each of the phases to be locked, namely a combination of upper arm (P side) switching element always ON and lower arm (N side) switching element OFF and a combination of upper arm (P side) switching element always OFF and lower arm (N side) switching element ON. That is, the number of modes m is calculated to be 6 by multiplying the number of phases to be locked by the number of operating states.

As shown in the table of FIG. 7, the mode determination unit 291 determines a mode m according to an address. The table of FIG. 7 is a correspondence table of modes m in the case of a control frequency of 15 kHz and a power supply frequency of 60 Hz. The mode determination unit 291 determines a correspondence relationship between a mode m and an address before performing an operation of compensating the harmonic current with the active filter device 4 and does not change the correspondence relationship between the mode m and the address during the operation of compensating the harmonic current. This is because changing the correspondence relationship between the mode m and the address during the compensating operation causes a distortion of a current waveform and makes correct control impossible.

In an alternative embodiment, the mode determination unit 291 may determine a mode m according to a power supply phase voltage. Specifically, the mode determination unit 291 determines for each address a mode m from Formulas (4) to (9) below according to the largest element of a total of six elements, namely the power supply phase voltages $v_r$, $v_s$, and $v_t$ and $-v_r$, $-v_s$, and $-v_t$ obtained by inverting the signs of the power supply phase voltages.

$$\text{Max}(v_r,v_s,v_t,-v_r,-v_s,-v_t)=v_r \Rightarrow m=1 \quad (4)$$

$$\text{Max}(v_r,v_s,v_t,-v_r,-v_s,-v_t)=-v_r \Rightarrow m=2 \quad (5)$$

$$\text{Max}(v_r,v_s,v_t,-v_r,-v_s,-v_t)=v_s \Rightarrow m=3 \quad (6)$$

$$\text{Max}(v_r,v_s,v_t,-v_r,-v_s,-v_t)=-v_s \Rightarrow m=4 \quad (7)$$

$$\text{Max}(v_r,v_s,v_t,-v_r,-v_s,-v_t)=v_t \Rightarrow m=5 \quad (8)$$

$$\text{Max}(v_r,v_s,v_t,-v_r,-v_s,-v_t)=-v_t \Rightarrow m=6 \quad (9)$$

As another method for determining a mode m, the mode determination unit 291 may use the duty cycles $D^*_r$, $D^*_s$, and $D^*_t$ to determine a mode m according to Formulas (10) to (15) below. It should be noted that the mode determination unit 291 determines a method for determining a mode prior to an operation of compensating the harmonic current and does not change the method for determining a mode during the compensating operation.

$$\text{Max}(D^*_r,D^*_s,D^*_t,-D^*_r,-D^*_s,-D^*_t)=D^*_r \Rightarrow m=1 \quad (10)$$

$$\text{Max}(D^*_r,D^*_s,D^*_t,-D^*_r,-D^*_s,-D^*_t)=-D^*_r \Rightarrow m=2 \quad (11)$$

$$\text{Max}(D^*_r,D^*_s,D^*_t,-D^*_r,-D^*_s,-D^*_t)=D^*_s \Rightarrow m=3 \quad (12)$$

$$\text{Max}(D^*_r,D^*_s,D^*_t,-D^*_r,-D^*_s,-D^*_t)=-D^*_s \Rightarrow m=4 \quad (13)$$

$$\text{Max}(D^*_r,D^*_s,D^*_t,-D^*_r,-D^*_s,-D^*_t)=D^*_t \Rightarrow m=5 \quad (14)$$

$$\text{Max}(D^*_r,D^*_s,D^*_t,-D^*_r,-D^*_s,-D^*_t)=-D^*_t \Rightarrow m=6 \quad (15)$$

The duty cycle modification unit 292 modifies the duty cycles for each address, that is, for each phase angle corresponding to an address, according to the mode m determined by the mode determination unit 291. FIG. 8 is a table showing an example of a method for modifying the duty cycles with the duty cycle modification unit 292 of Embodiment 1. The duty cycle modification unit 292 modifies the duty cycles $D^*_r$, $D^*_s$, and $D^*_t$ according to the mode m according to formulas shown in the table of FIG. 8. For example, in the case of mode 1, the duty cycles $D^*_r$, $D^*_s$, and $D^*_t$ are modified to "+1", "$D^*_s+(1-D^*_r)$", and "$D^*_t+(1-D^*_r)$", respectively.

In the case of a duty cycle of "+1", the upper arm (P side) switching element is always ON. In the case of a duty cycle of "−1", the upper arm (P side) switching element is always OFF. In the case of a duty cycle of "0", the upper arm (P side) switching element is 50% ON. A two-phase modulation operation is achieved by making any one of the three duty cycles "+1" or "−1". In the case of a duty cycle of "+1" or "−1", no switching is done; therefore, no switching loss is produced, so that a loss of the switching element can be reduced. The duty cycles $D^*_r$, $D^*_s$, and $D^*_t$ thus modified are outputted to the control signal generation unit 30.

With continued reference to FIG. 2, the control signal generation unit 30 generates, from the duty cycles $D^*_r$, $D^*_s$, and $D^*_t$ outputted from the duty cycle modulation unit 29, control signals to drive the power module 7. A commonly-known technique is pulse width modulation (PWM). Specifically, six ON/OFF signals are generated by comparing the duty cycles $D^*_r$, $D^*_s$, and $D^*_t$ outputted from the duty cycle modulation unit 29 with a triangular wave. Moreover, the six control signals $S_{rp}$, $S_{rn}$, $S_{sp}$, $S_{sn}$, $S_{tp}$, and $S_{tn}$ are outputted by adding a dead time (Td) period during which the upper and lower arms are both OFF so that the upper and lower arms do not get short-circuited.

Moreover, the switching elements of the power module 7 are subjected to ON/OFF control based on the control signals, whereby the compensating currents $i_{Ar}$, $i_{As}$, and $i_{At}$ are generated. These compensating currents $i_{Ar}$, $i_{As}$, and $i_{At}$ are supplied to the three-phase power source 1 via the control reactor 6 and the filter circuit 5. This causes the harmonic current to be suppressed by canceling out the compensating currents $i_{Ar}$, $i_{As}$, and $i_{At}$ outputted from the active filter device 4 and the load currents $i_{Lr}$, $i_{Ls}$, and $i_{Lt}$ of the inverter device 2.

Figure 9:
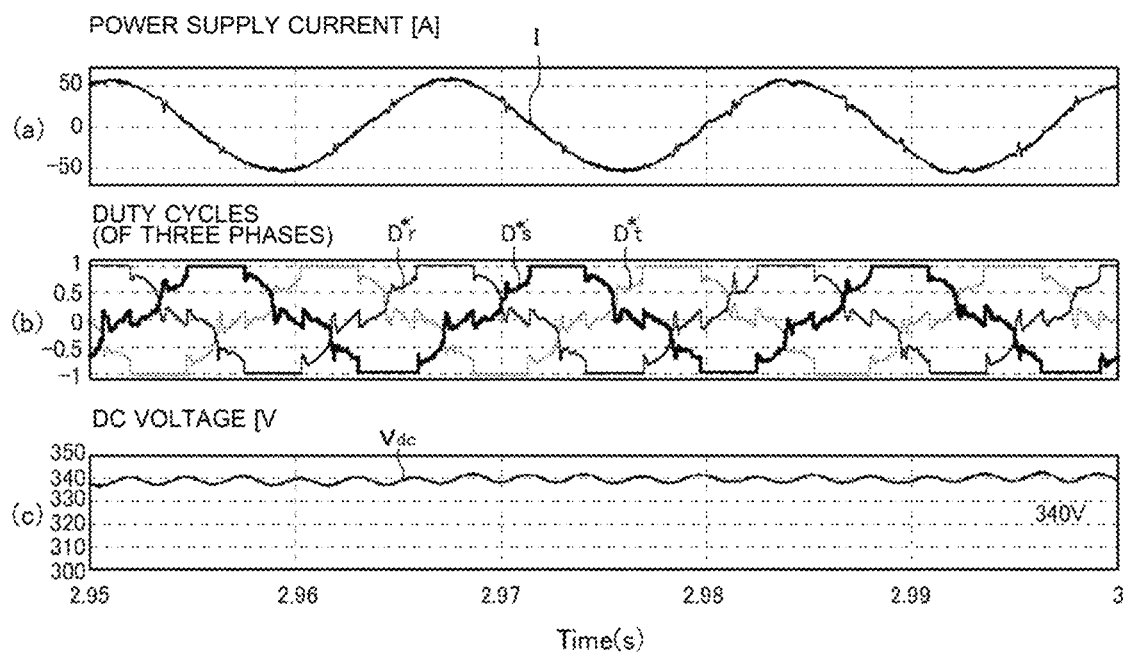
FIG. 9 illustrates examples of operating waveforms in the active filter device of Embodiment 1.

FIG. 9 illustrates examples of operating waveforms in the active filter device 4 of Embodiment 1. In FIG. 9, (a), (b), and (c) show the waveforms of the power supply current, the duty cycles, and the DC voltage, respectively. As shown in FIG. 9, any one of the duty cycles is "+1" or "−1". This shows that two-phase modulation can be achieved. Further, as shown in (a) of FIG. 9, the power supply current can be controlled on a sinusoidal wave. Further, the DC voltage $v_{dc}$ of FIG. 9 is 340 V.

Figure 10:
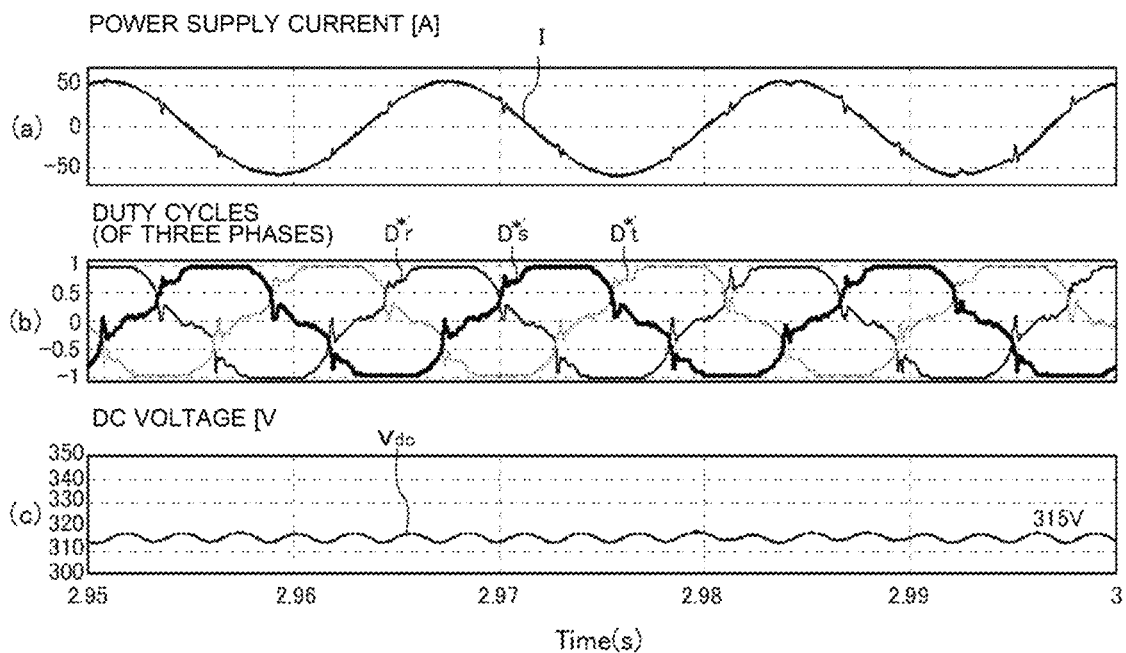
FIG. 10 illustrates examples of operating waveforms in an active filter device of Embodiment 1.

FIG. 10 illustrates examples of operating waveforms in the active filter device 4 of Embodiment 1. In FIG. 10, (a), (b), and (c) show the waveforms of the power supply current, the duty cycles, and the DC voltage, respectively. Further, FIG. 11 illustrates examples of operating waveforms in an active filter device of a comparative example. In FIG. 11, (a), (b), and (c) show the waveforms of a power supply current, duty cycles, and a DC voltage, respectively. It should be noted that the active filter device of the comparative example does not include at least the duty cycle modulation unit 29. FIGS. 10 and 11 illustrate operating waveforms in the case of a DC voltage $v_{dc}$ of 315 V.

As shown in FIG. 11, setting the DC voltage $v_{dc}$ to 315 V in the comparative example causes a distortion of the waveform of the power supply current, making the active filter device unable to operate properly. On the other hand, as shown in FIG. 10, the active filter device 4 according to Embodiment 1 can control the power supply current on a sinusoidal wave even in a case in which the DC voltage $v_{dc}$ is set to 315 V. Since the DC voltage $v_{dc}$ can be reduced, a switching loss of the power module 7 is reduced. Furthermore, since the current pulsation of a carrier component of the control reactor 6 is reduced, an electrical current in a band of control frequencies of the control reactor 6 can be reduced, so that an iron loss of the control reactor 6 can be reduced.

As noted above, in the present embodiment, including the duty cycle modulation unit 29 enables the active filter device 4 to achieve a two-phase modulation operation. This makes it possible to, while suppressing the harmonic current, achieve a loss reduction of the power module 7 by decreasing the number of times switching is done in the power module 7 and reducing the DC voltage $v_{dc}$.

Further, further raising the control frequency as much as the loss of the power module 7 is reduced makes it possible to reduce the inductance of the reactor of the filter circuit 5 or the control reactor 6 and achieve further reductions in cost and loss of the reactor. Further, since the DC voltage $v_{dc}$ can be reduced, the harmonic current can be suppressed even in a case in which the power supply voltage is higher than it is in the conventional technology.

Embodiment 2

The following describes Embodiment 2. Embodiment 2 differs from Embodiment 1 in terms of the method for determining a mode with the mode determination unit 291 of the duty cycle modulation unit 29. The following description is given with a focus on the difference from Embodiment 1.

Figure 12:
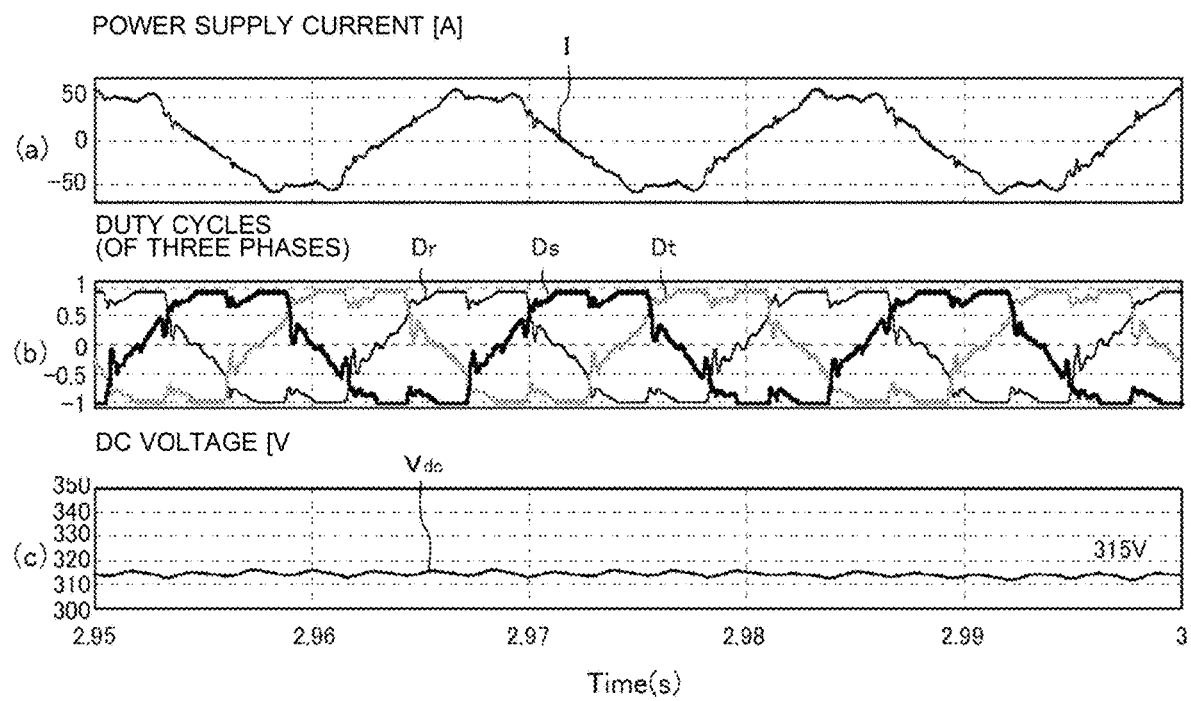
FIG. 12 is a table showing an example of a method for determining a mode with a mode determination unit of Embodiment 2.

FIG. 12 is a table showing an example of a method for determining a mode with a mode determination unit 291 of Embodiment 2. While Embodiment 1 is configured such that addresses are evenly associated with each mode, the present embodiment is configured such that different ranges of addresses are associated with different modes. Specifically, in comparison with the mode determination table of Embodiment 1 shown in FIG. 7, each of the ranges of addresses associated with modes 1 and 2 is expanded by a total of twenty addresses consisting of ten addresses added to the beginning of the range and ten addresses added to the end of the range. Meanwhile, each of the ranges of addresses associated with modes 3 to 6 is narrowed.

Making such a mode determination extends an always-ON period or always-OFF period (i.e. a two-phase modulation period) of the R phase. This makes it possible to reduce a switching loss of the R phase. While FIG. 12 has been described by taking the R phase as an example, it is possible to extend a two-phase modulation period of the S phase by lengthening the duration of modes 3 and 4 and extend a two-phase modulation period of the T phase by lengthening the duration of modes 5 and 6.

In particular, in a case in which there is an imbalance in power supply voltage, there are variations in magnitude of electrical current among the phases. Moreover, a phase with a large current suffers a great loss of the power module 7, so that there are variations in loss among the phases. To address this problem, the mode determination unit 291 of the present embodiment determines a mode so that the always-ON period or always-OFF period of a phase with a large current is longer than the always-ON period or always-OFF period of a phase with a small current. By thus lengthening the duration of two-phase modulation of a phase with a large current and shortening the duration of two-phase modulation of a phase with a small current, variations in loss can be reduced.

Figure 13:
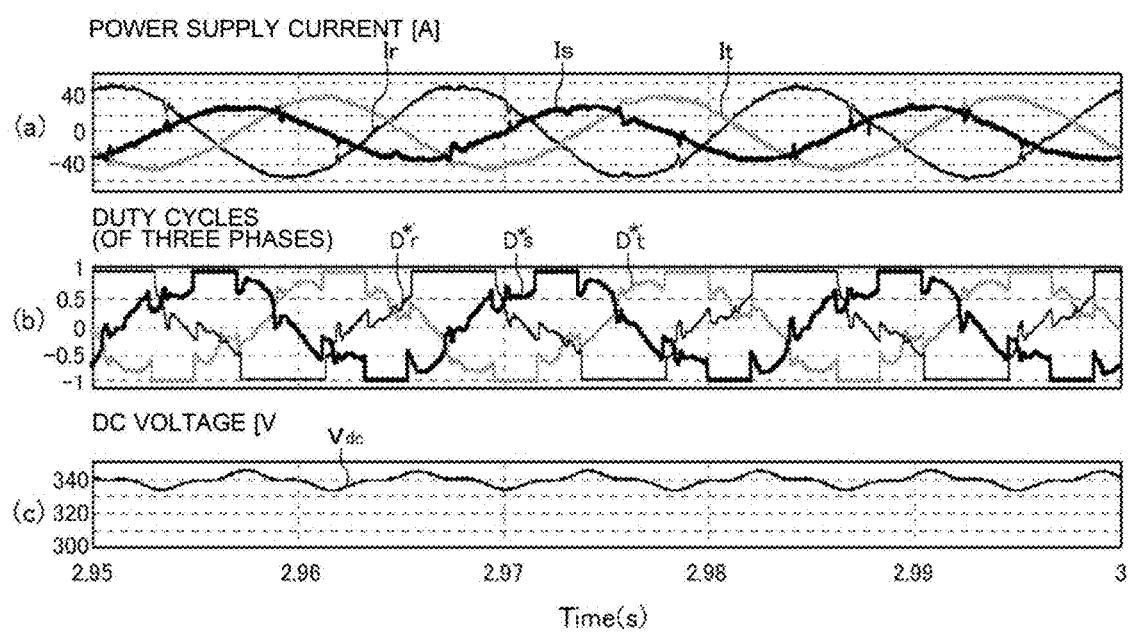
FIG. 13 illustrates examples of operating waveforms in an active filter device of Embodiment 2.

FIG. 13 illustrates examples of operating waveforms in an active filter device 4 of Embodiment 2. In FIG. 13, (a), (b), and (c) show the waveforms of power supply currents, duty cycles, and a DC voltage, respectively. As shown in FIG. 13, any one of the duty cycles is "+1" or "−1". This shows that two-phase modulation can be achieved. Furthermore, as shown in (b) of FIG. 13, an operation in which periods of two-phase modulation are uneven can be achieved.

As noted above, the present embodiment too can bring about effects similar to those of Embodiment 1. Furthermore, the balance of losses of the power module 7 can be achieved by adjusting the period of two-phase modulation of each phase according to magnitude of electrical current.

While the foregoing has described embodiments of the present disclosure, the present disclosure is not limited to the foregoing embodiments but may be modified in various ways without departing from the scope of the present disclosure. For example, while the foregoing embodiments have been described with reference to a case in which the inverter device 2 of the air conditioner 100 is a load device, the active filter device 4 can be used to suppress a harmonic current in another load device.

The invention claimed is:

1. An active filter device comprising:
a power module configured to generate a compensating current to suppress a harmonic current generated from a load device; and
a controller configured to control the power module,
wherein the controller is configured to
calculate a compensating current command to suppress the harmonic current,
calculate a control variable based on a deviation between the compensating current command and an actual compensating current,
calculate a duty cycle of each of three phases based on the control variable,
perform two-phase modulation on the duty cycle of each of three phases, and
generate, from the duty cycle of each of three phases after the two-phase modulation, a control signal to drive the power module.

2. The active filter device of claim 1, wherein the controller is further configured to calculate, from a control frequency of the power module and a frequency of a power supply voltage, addresses corresponding to a phase angle of the power supply voltage,
wherein the controller is configured to, in the two-phase modulation,
determine, for each of the addresses, any of a plurality of modes differing according to a phase to be locked among the three phases and an operating state of the phase to be locked, and
modify the duty cycle for each of the addresses according to the mode determined by the mode determination unit.

3. The active filter device of claim 2, wherein the controller is configured to determine the mode according to the address.

4. The active filter device of claim 3, wherein the controller is configured to determine the mode based on a table associating the address with the mode.

5. The active filter device of claim 2, wherein the controller is configured to determine the mode according to the power supply voltage or the duty cycle.

6. The active filter device of claim 5, wherein the controller is configured to determine the mode according to a largest element of the power supply voltage or a largest element of the duty cycle.

7. The active filter device of claim 2, wherein the controller is configured to determine the mode so that an always-ON period or always-OFF period of a phase with a large current among the three phases is longer than an always-ON period or always-OFF period of a phase with a small current among the three phases.

8. The active filter device of claim 2, wherein the controller is configured not to change a method for determining the mode during an operation of compensating the harmonic current.

9. The active filter device of claim 2, wherein
the controller has for each of the addresses a plurality of integrators configured to integrate a deviation between the compensating current command and an actual compensating current and calculates the control variable based on values of integral yielded by the plurality of integrators.

10. An air conditioner comprising:
the active filter device of claim 1,
an inverter device serving as the load device; and
a compressor configured to be driven by the inverter device.

* * * * *